No. 607,881. Patented July 26, 1898.
H. REICHARDT & J. BUEB.
PROCESS OF MAKING CYANIDS FROM MOLASSES LYES.
(Application filed May 24, 1895.)
(No Model.)
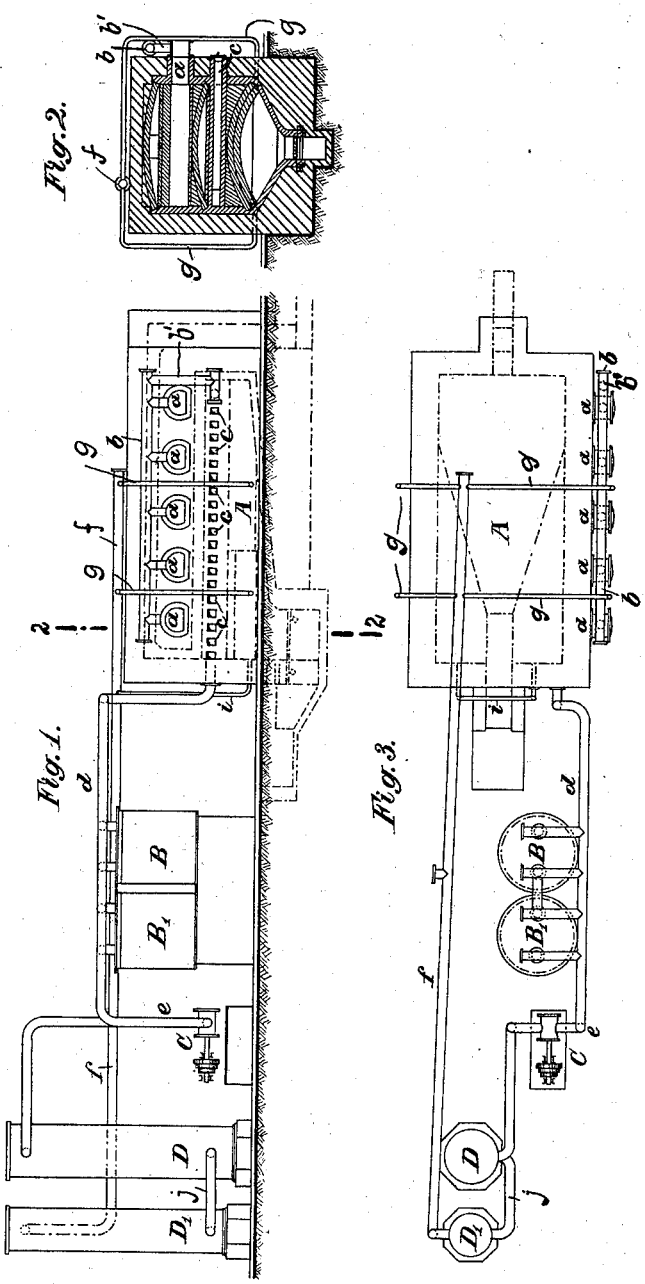
Witnesses:
Inventors:
Hermann Reichardt
Julius Bueb,
by their Atty.

UNITED STATES PATENT OFFICE.

HERMANN REICHARDT AND JULIUS BUEB, OF DESSAU, GERMANY.

PROCESS OF MAKING CYANIDS FROM MOLASSES-LYES.

SPECIFICATION forming part of Letters Patent No. 607,881, dated July 26, 1898.

Application filed May 24, 1895. Serial No. 550,559. (No specimens.)

*To all whom it may concern:*

Be it known that we, HERMANN REICHARDT, a subject of the Duke of Anhalt-Dessau, and JULIUS BUEB, a subject of the Grand Duke of Baden, residing at Dessau, in the Duchy of Anhalt-Dessau, German Empire, have invented new and useful Improvements in Processes of Manufacturing Cyanids out of Molasses and Lyes Resulting from Beet-Root Molasses, of which the following is a specification.

Our invention has reference to a process for obtaining cyanid of ammonium from molasses and the waste lyes resulting from the manufacture of sugar.

Of the valuable constituents contained in molasses and in the lyes of beet-root molasses sugar and potassium salts have been extracted; but up to the present time no process has been discovered for also separating the valuable nitrogenous compounds in a rational and economical manner. All the experiments made for this purpose by sugar manufacturers and distillers manufacturing alcohol from beet-root molasses have given a negative result.

In the present processes for working molasses the nitrogen contained in the molasses escapes from the chimney in the form of compounds having bad odors to the detriment and annoyance of the neighborhood. The processes heretofore known for obtaining the volatile compounds formed in the distillation of molasses and the lyes of beet-root molasses obtain these substances from the hot gases of distillation in the same form in which they actually exist when they leave the distilling vessels—that is to say, in the form of ammonia and of methylic compounds, (methylic alcohol, methylamin, &c.;) but none of these processes has been of permanent practical application, because, on the one hand, the products obtained as above mentioned were extracted in too small a quantity and in too impure a condition, and, on the other hand, because there was not a sufficient demand for these products for industrial purposes.

According to the process forming the subject of our present invention we obtain from the distilling-gases of molasses and of the lyes of beet-root molasses by treating them in a peculiar manner a substance which hitherto has not been produced therefrom—namely, cyanogen. By this means we are enabled to extract in a comparatively simple manner the nitrogen from the molasses in a highly-valuable form, avoiding at the same time the bad odors ordinarily connected with the distillation of molasses and the lyes of beet-root molasses.

The said process consists in leading the gases produced in the dry distillation of molasses and of the lyes of beet-root molasses at once and without cooling them previously through a system of fire-brick channels heated to a bright red or a white head, (1,100° to 1,200° centigrade.) The distilling-gases of molasses and of the lyes of beet-root molasses having passed this heating system are transformed in such a manner that the nitrogen is contained in the product of distillation exclusively in the form of cyanid of ammonium mixed with a small quantity of carbonate of ammonium.

By leading the gases through a solution of iron salts the cyanogen is easily separated as a ferrocyanid. This latter substance forms an excellent base for the production of yellow prussiate of potash or cyanid of potassium.

The carbonic acid or oxid and carburets of hydrogen contained in large quantities in the products of distillation are almost entirely freed from nitrogenous compounds and can be utilized in any suitable manner.

In carrying out the process in practice any suitable apparatus may be employed—for instance, that shown in the annexed drawings, in which—

Figure 1 represents a side elevation. Fig. 2 is a vertical section on the line 2 2, Fig. 1. Fig. 3 is a plan view.

Similar letters of reference designate corresponding parts throughout the several views of the drawings.

Referring to said drawings, the letter A designates a furnace provided with a series of retorts $a$, which can be closed air-tight and are intended for the reception of the molasses-lyes. Below these retorts is located a series of parallel connected channels $c$, placed in communication with the retorts $a$ by the header $b$ and branch pipes $b'$.

C is an exhauster connected with the terminal channel $c$ by the pipes $d$ $e$ for exhausting the gases from the channels. The pipe $d$ is connected with two absorption vessels B B', in which the cyanid of ammonia is absorbed from the gases. The exhauster has its discharge end connected with a cooler D, in which the temperature of the remaining gases is reduced to that of the atmosphere. The lower end of the cooler is connected by a pipe $j$ with the bottom of a scrubber D', in which the gases are freed from tar and the last traces of ammonia.

$f$ is a return-pipe leading from the scrubber to the furnace and connected by branch pipes $g$ and $i$ to the fireplace.

With this apparatus the process is carried out as follows: The molasses or lye to be distilled flows into the retorts $a$, which are heated to a dull-red heat. The escaping gases are drawn by means of the exhauster C through the pipes $b$ $b'$ and the channel $c$, which latter are heated to a temperature of from 1,100° to 1,200° centigrade, and the length and cross-section of which are such that the gases are subjected for about fifteen seconds to this temperature. The production of cyanid of ammonium takes place in these channels. The gases pass from the channel $c$ through the pipe $d$ to the absorption-vats B B', where the cyanid of ammonium is absorbed by the iron salt. From the absorption-vats the gases are carried through the pipes $d$ $e$ to the exhauster C and from thence to the cooler D and the scrubber D'. In the cooler the temperature of the gases is reduced to that of the atmosphere, whereby water-vapor and the remainder of the cyanogen and ammonia are condensed. In the scrubber the tar and the last traces of ammonia are removed. From the scrubber the gases are led through the pipe $f$ and distributed by the pipes $g$ and $i$ to the fireplace of the furnace, where they are burned and serve to heat the retorts and the channels. The waste gases after cooling contain about thirty per cent., by volume, of carbonic-acid gas and can be used for the precipitation of alkaline earths, (baryta, strontia, or lime,) which are found in the lye after the removal of the sugar.

In the formation of cyanogen induced by subjecting the gases of distillation to a red heat numerous nitrogenous compounds, part of which are known and part unknown, as also the amins contained in the gases of distillation, take part according to the following equations:

Methylamin $(CH_3)NH_2 = HCN + 2H_2$.

Dimethylamin $(CH_3)_2NH = HCN + CH_4 + H_2$.

Trimethylamin $(CH_3)_3N = HCN + 2CH_4$.

Triethylendiamin $(C_2H_4)_3N_2 = 2HCN + 2C_2H_4 + H_2$.

The hydrocyanic acid thus formed combines with the ammoniacal gas of the molasses or lyes thereof to form ammonium cyanid.

What we claim as new is—

1. The herein-described process for the direct production of cyanid of ammonium from molasses, or molasses-lyes, and simultaneously destroying the odor of the gases, consisting in distilling the substances under the exclusion of air and maintaining the products of distillation at a temperature of about 1,100° centigrade until cyanid of ammonium is formed.

2. The herein-described process for the direct production of cyanid of ammonium from molasses, or molasses-lyes, and simultaneously destroying the odor of the gases, consisting in distilling the substances under the exclusion of air; maintaining the products of distillation at a temperature of about 1,100° centigrade until cyanid of ammonium is formed, and finally separating the cyanid of ammonium from the products of distillation.

In testimony whereof we have signed our names to this specification in the presence of two subscribing witnesses.

HERMANN REICHARDT.
JULIUS BUEB.

Witnesses:
Wm. Haupt,
Chas. H. Day.